United States Patent
Itoh et al.

(10) Patent No.: US 12,503,159 B2
(45) Date of Patent: Dec. 23, 2025

(54) STEERING SYSTEM AND WORK MACHINE

(71) Applicant: HONDA MOTOR CO., LTD., Tokyo (JP)

(72) Inventors: Jun Itoh, Wako (JP); Shugo Miyamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 542 days.

(21) Appl. No.: 18/185,484

(22) Filed: Mar. 17, 2023

(65) Prior Publication Data
US 2024/0308582 A1    Sep. 19, 2024

(51) Int. Cl.
*B62D 7/08*    (2006.01)
*B62D 5/04*    (2006.01)
*B62D 11/04*    (2006.01)

(52) U.S. Cl.
CPC ............. *B62D 7/08* (2013.01); *B62D 5/0421* (2013.01); *B62D 11/04* (2013.01)

(58) Field of Classification Search
CPC ................................ B62D 7/08; B62D 5/0421
USPC ......................................................... 180/444
See application file for complete search history.

(56) References Cited

U.S. PATENT DOCUMENTS

| 9,725,115 | B1 | 8/2017 | Hauser et al. |
| 2014/0371991 | A1* | 12/2014 | Buchanan ................ B62D 7/20 |
| | | | 701/41 |
| 2018/0148089 | A1 | 5/2018 | Kuriyagawa et al. |

FOREIGN PATENT DOCUMENTS

JP    6559111 B2    8/2019

* cited by examiner

*Primary Examiner* — John Olszewski
*Assistant Examiner* — Nathaniel William Watkins
(74) *Attorney, Agent, or Firm* — Rankin, Hill & Clark LLP

(57) ABSTRACT

A steering system according to the present disclosure includes a first drive gear and a second drive gear that are provided on a shaft, and a pair of link mechanisms disposed on both sides of the shaft. Each of the pair of link mechanisms includes a first driven gear, a second driven gear, a first tie rod, and a second tie rod.

6 Claims, 10 Drawing Sheets

STEERING SYSTEM AND WORK MACHINE

BACKGROUND OF THE INVENTION

Field of the Invention

The present disclosure relates to a steering system and a work machine.

Description of the Related Art

U.S. Pat. No. 9,725,115 B1 discloses a work machine in which the front wheel is steerable.

SUMMARY OF THE INVENTION

There is a long-awaited need for a work machine capable of favorably making a sharp turn.

An object of the present invention is to solve the above-mentioned problem.

According to an aspect of the present invention, there is provided a steering system comprising: a shaft rotatable in a first rotation direction or a second rotation direction opposite to the first rotation direction from an initial position that is a rotational position of the shaft during straight traveling; steered wheels provided on left and right sides and configured to be steered in accordance with rotation of the shaft; support members provided on the left and right sides and each configured to support corresponding one of the steered wheels; a first drive gear provided on the shaft; a second drive gear provided on the shaft at a distance from the first drive gear in an axial direction of the shaft; and a pair of link mechanisms disposed on both sides of the shaft, wherein each of the pair of link mechanisms includes: a first driven gear configured to mesh with the first drive gear; a second driven gear whose relative position with respect to the first driven gear is fixed, the second driven gear being configured to mesh with the second drive gear; a first tie rod configured to connect the first driven gear and corresponding one of the support members; and a second tie rod extending along the first tie rod and configured to connect the second driven gear and corresponding one of the support members, and wherein a radius of an addendum circle of the first drive gear is larger than a radius of an addendum circle of the second drive gear, a radius of an addendum circle of the first driven gear is smaller than a radius of an addendum circle of the second driven gear, in accordance with the rotation of the shaft in the first rotation direction from the initial position, the second driven gear meshes with the second drive gear in one of the pair of link mechanisms and the first driven gear meshes with the first drive gear in another of the pair of link mechanisms, and in accordance with the rotation of the shaft in the second rotation direction from the initial position, the first driven gear meshes with the first drive gear in the one of the pair of link mechanisms and the second driven gear meshes with the second drive gear in the other of the pair of link mechanisms.

According to another aspect of the present invention, there is provided a work machine comprising the steering system described above.

According to the present invention, a steering system and a work machine capable of favorably making a sharp turn are provided.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

As an index of the ability to make a sharp turn, a minimum turning radius is known. The minimum turning radius is the radius of a circle drawn by the center of an outermost steered wheel when steered to the maximum extent. The smaller the minimum turning radius is, the higher the ability to make a sharp turn is.

U.S. Pat. No. 9,725,115 B1 discloses making the turning radius (minimum turning radius) 0. However, when the turning angle of the inner wheel and the turning angle of the outer wheel are the same at the time of turning of the vehicle, the smaller the minimum turning radius is, the more likely the steered wheel is to slip. The following discloses an embodiment for favorably making a sharp turn.

Figure 1:
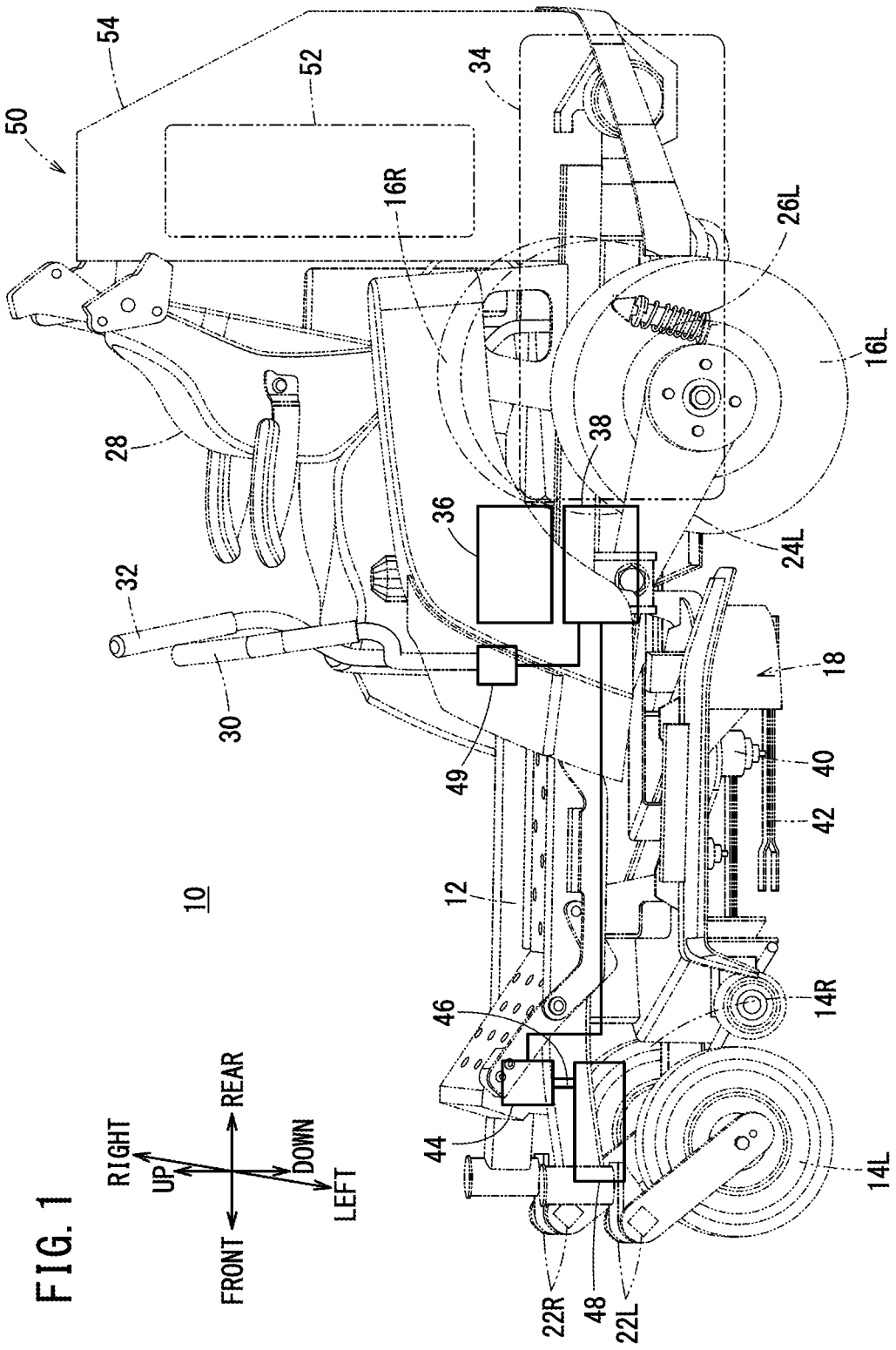
FIG. 1 is a diagram showing a work machine according to the present embodiment.

FIG. 1 is a diagram showing a work machine 10 according to the present embodiment. Here, a case where the work machine is a lawn mower will be described as an example, but the work machine is not limited thereto. The lawn mower is a machine for cutting lawn grass. The letter "L" is added to the end of a reference numeral indicating a component located on the left side of the work machine 10. Similarly, the letter "R" is added to the end of a reference numeral indicating a component located on the right side of the work machine 10. Note that the term "left" may be added to the beginning of the name of a component located on the left side. Similarly, the term "right" may be added to the beginning of the name of a component located on the right side.

The work machine 10 includes a vehicle body frame 12, a pair of front wheels (a left front wheel 14L and a right front wheel 14R), a pair of rear wheels (a left rear wheel 16L and a right rear wheel 16R), and a work deck 18 (work section).

The left front wheel 14L is connected to the vehicle body frame 12 via a pair of left front forks 22L. The right front wheel 14R is connected to the vehicle body frame 12 via a pair of right front forks 22R. On the other hand, the left rear wheel 16L is connected to the vehicle body frame 12 via a left swing arm 24L and a left suspension 26L. Similarly, the right rear wheel 16R is connected to the vehicle body frame 12 via a right swing arm (not shown) and a right suspension (not shown).

A seat 28 and a pair of control levers 30 and 32 are provided on an upper portion of the vehicle body frame 12. A battery 34, a first power drive unit 36, and a second power drive unit 38 are provided between the seat 28, the left swing arm 24L, and the right swing arm (not shown). The first power drive unit 36 is referred to as the first PDU 36. The second power drive unit 38 is referred to as the second PDU 38.

The first PDU 36 is a control unit that controls a work motor 40. A blade 42 is rotatably supported by the work motor 40. The blade 42 is provided on the work deck 18. The work deck 18 is provided between the pair of front wheels and the pair of rear wheels in a lower portion of the work machine 10. The first PDU 36 controls the work motor 40 to adjust the rotational speed and the like of the blade 42.

The second PDU 38 is a control unit that controls a left traction motor (not shown), a right traction motor (not shown), and a steering motor 44. The left traction motor is provided at a left rear portion of the work machine 10, and the right traction motor is provided at a right rear portion of the work machine 10. The second PDU 38 controls the left traction motor and the right traction motor to adjust the rotational speed and the like of the pair of rear wheels.

The steering motor 44 is provided between the pair of front wheels in a front portion of the work machine 10. A steering system 48 is connected to a shaft 46 of the steering motor 44. The second PDU 38 controls the steering motor 44 to steer the pair of front wheels through the steering system 48.

A position sensor 49 for detecting the positions of the pair of control levers 30 and 32 is connected to the second PDU 38. Based on the position detected by the position sensor 49, the second PDU 38 calculates the rotation angle of the steering motor 44 that corresponds to the operation of the pair of control levers 30 and 32. The second PDU 38 outputs rotation angle information obtained by the calculation, to the steering motor 44.

The rotation angle is calculated using, as an initial position, the rotational position of the shaft 46 when the work machine 10 travels straight. When the shaft 46 is at the initial position, the rotation angle is 0, and the work machine 10 is in a state of capable of traveling straight. The rotation angle corresponding to the initial position is set in the second PDU 38 in advance. When the rotation angle is +X degrees, the shaft 46 rotates by X degrees From the initial position in a first rotation direction. On the other hand, when the rotation angle is −X degrees, the shaft 46 rotates by X degrees From the initial position in a second rotation direction opposite to the first rotation direction.

The work machine 10 includes an autonomous control unit 50 that autonomously controls the work motor 40, the traction motors, and the steering motor 44. The autonomous control unit 50 includes a control circuit 52, and a housing 54 that houses the control circuit 52. The housing 54 is disposed above the battery 34 in the rear portion of the work machine 10, for example.

The autonomous control unit 50 may be an accessory device that is added according to a user's request. Alternatively, the autonomous control unit 50 may be turned on and off by an automatic switch. When the automatic switch is OFF, the first PDU 36 and the second PDU 38 operate, and the control circuit 52 of the autonomous control unit 50 does not operate. On the other hand, when the automatic switch is ON, the first PDU 36 and the second PDU 38 do not operate, and the control circuit 52 of the autonomous control unit 50 operates.

The control circuit 52 includes a GPS receiver and a storage medium. The storage medium stores map data, a travel trajectory, and the like. The travel trajectory is a trajectory obtained when the work machine 10 travels by being operated by an operator. The travel trajectory may be associated with a work history obtained when the work machine 10 travels. The control circuit 52 controls the work motor 40 and the traction motors based on the travel trajectory. Further, the control circuit 52 controls the steering motor 44 based on the travel trajectory. In this case, the control circuit 52 calculates the rotation angle based on the travel trajectory.

When the control circuit 52 performs control based on the travel trajectory, the work machine 10 travels along the stored travel trajectory even if the operator is not on board. Alternatively, the work machine 10 travels along the stored travel trajectory while performing work.

Figure 2:
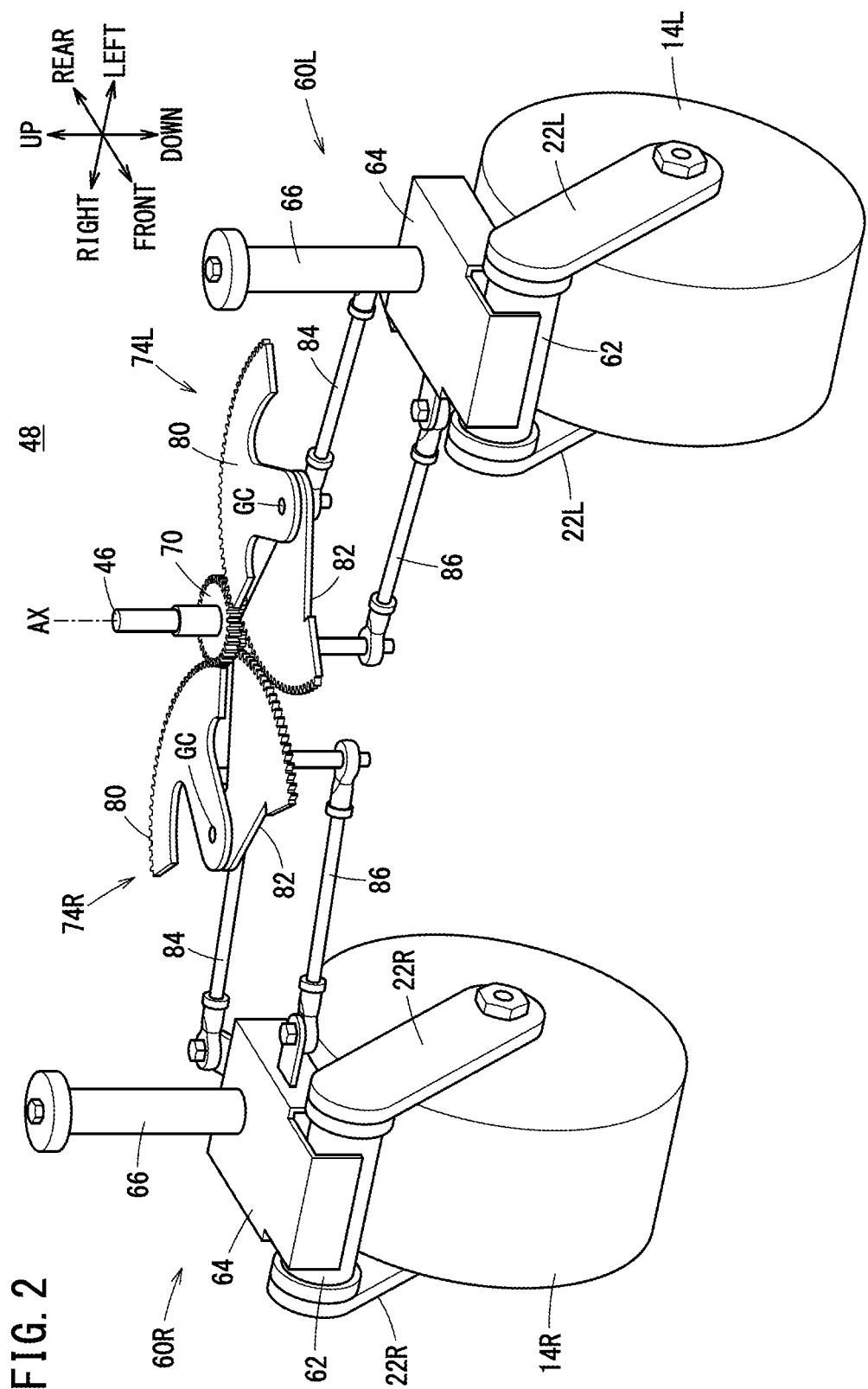
FIG. 2 is a perspective view showing a steering system.
Figure 3:
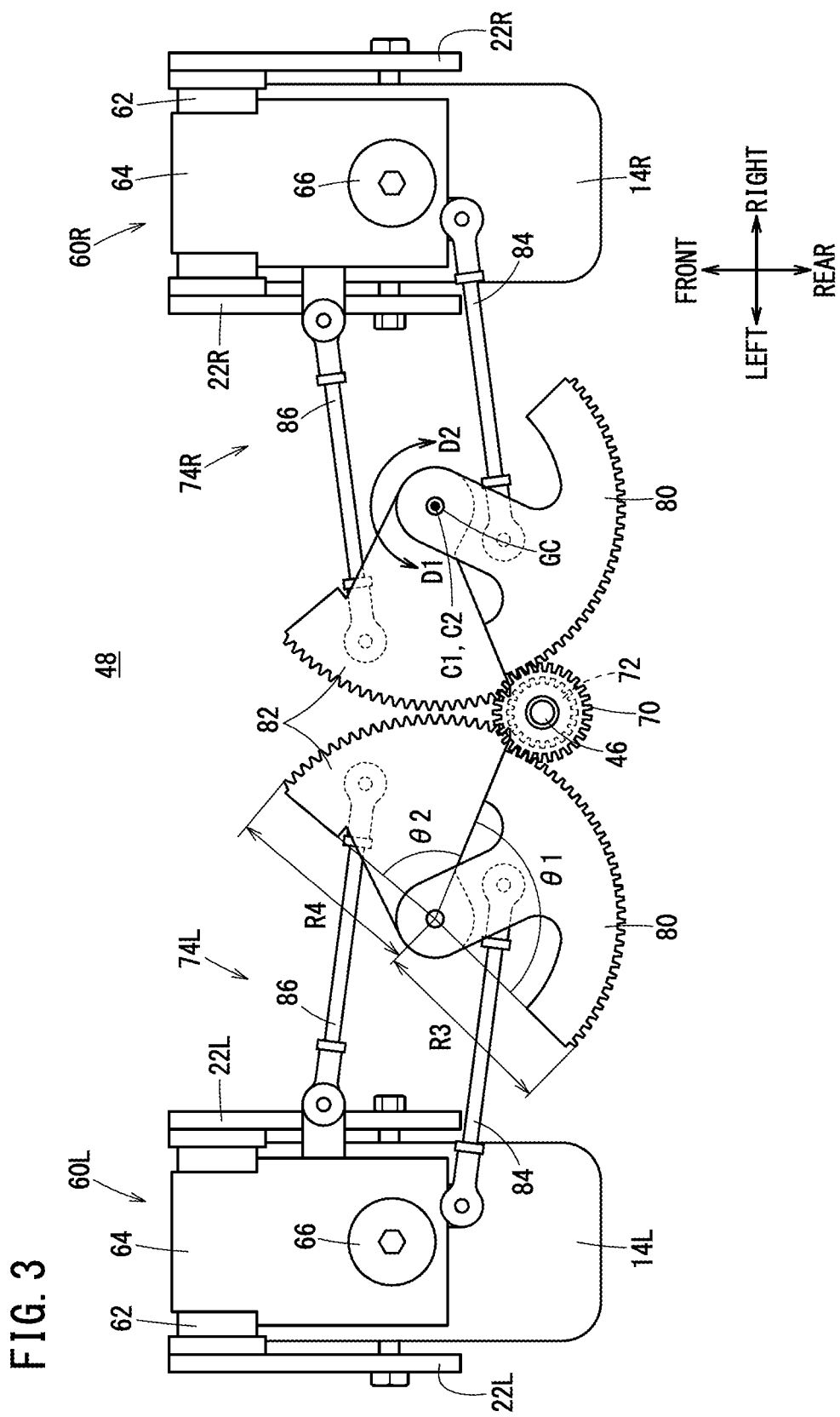
FIG. 3 is a top view of the steering system.
Figure 4:
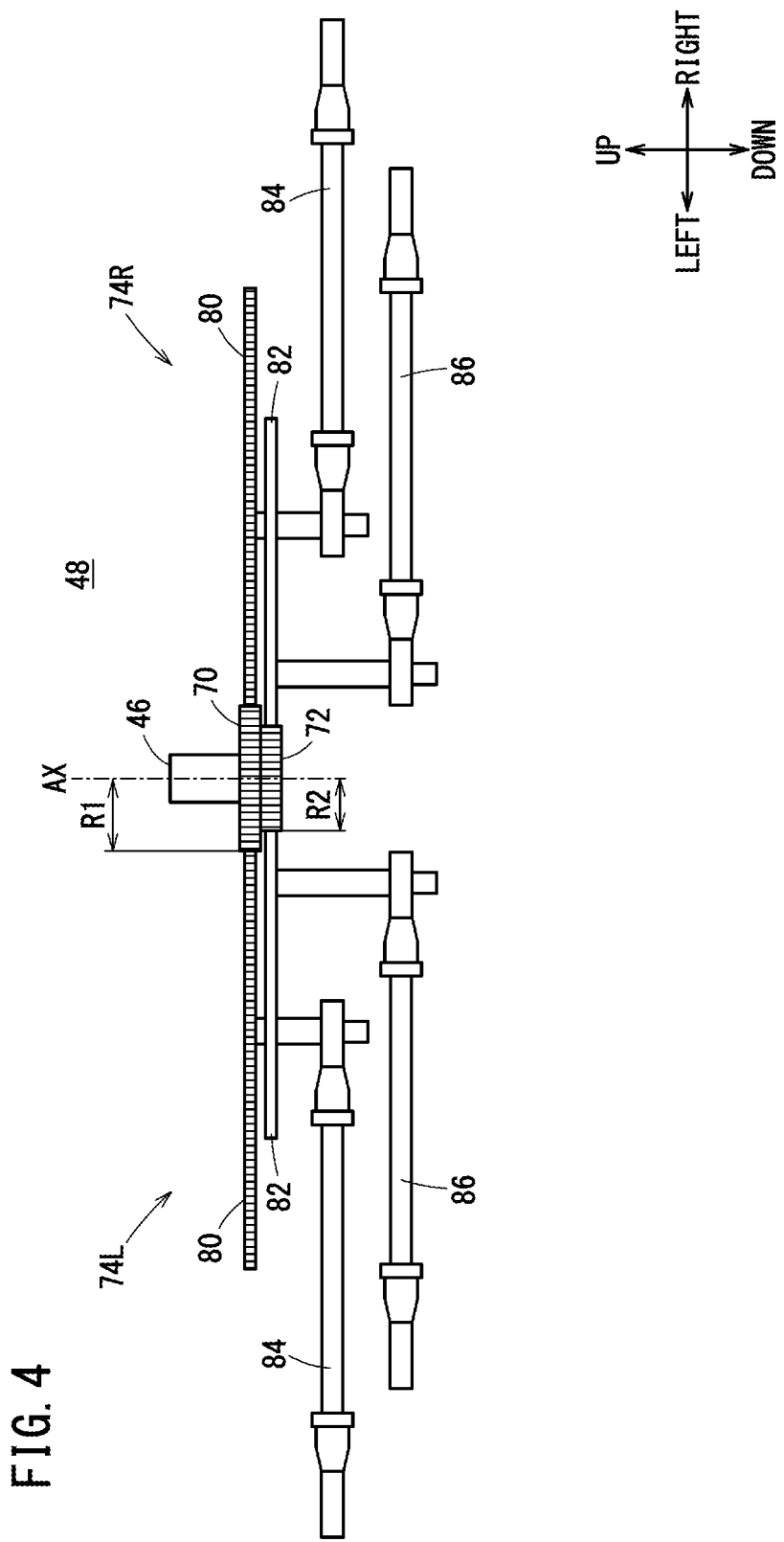
FIG. 4 is a rear view of the steering system.

Next, the steering system 48 will be described with reference to FIGS. 2 to 4. FIG. 2 is a perspective view showing the steering system 48. FIG. 3 is a top view of the steering system 48. FIG. 4 is a rear view of the steering system 48.

The steering system 48 includes the shaft 46, the left and right steered wheels (the left front wheel 14L and the right front wheel 14R), and left and right support members (a left support member 60L and a right support member 60R).

The shaft 46 rotates according to the rotation angle. As described above, when the rotation angle information indicating the rotation angle is output from the second PDU 38 to the steering motor 44, the shaft 46 rotates by a first rotation angle or a second rotation angle indicated by the rotation angle information.

The left and right support members are disposed on both sides of the shaft 46. The left support member 60L disposed on the left side of the shaft 46 and the right support member 60R disposed on the right side of the shaft 46 each include a first connecting portion 62, a pedestal portion 64, and a second connecting portion 66.

The first connecting portion 62 on the left side connects one end portions of the pair of left front forks 22L. The first connecting portion 62 on the right side connects one end portions of the pair of right front forks 22R. The left front wheel 14L is rotatably attached to the other end portions of the pair of left front forks 22L. The right front wheel 14R is rotatably attached to the other end portions of the pair of right front forks 22R. The pedestal portion 64 is fixed to the first connecting portion 62, and the second connecting portion 66 extends upward from the pedestal portion 64. The second connecting portion 66 is fixed to the vehicle body frame 12.

The steering system 48 includes a first drive gear 70, a second drive gear 72 (see FIG. 3), and a pair of link mechanisms (a left link mechanism 74L and a right link mechanism 74R).

The first drive gear 70 is provided on the shaft 46. The second drive gear 72 is provided on the shaft 46 at a distance from the first drive gear 70 in the axial direction of the shaft 46 (in the up-down direction). In the present embodiment, the second drive gear 72 is disposed below the first drive gear 70 (see FIG. 4).

The teeth of the first drive gear 70 and the teeth of the second drive gear 72 extend in a direction intersecting an axis AX of the shaft 46. This direction is practically orthogonal to the axis AX of the shaft 46. The tooth trace of the first drive gear 70 and the tooth trace of the second drive gear 72 are practically parallel to the axis AX of the shaft 46. The tooth trace is a line of intersection between a tooth flank and a bottom land. The first drive gear 70 and the second drive gear 72 may be spur gears.

A radius R1 (FIG. 4) of the addendum circle of the first drive gear 70 is larger than a radius R2 (FIG. 4) of the addendum circle of the second drive gear 72. Although not shown, the radius of the root circle of the first drive gear 70 is larger than the radius of the root circle of the second drive gear 72. The addendum circle is a circle passing through the tips of the teeth, and the root circle is a circle passing through the roots of the teeth.

The pair of link mechanisms are disposed on both sides of the shaft 46. The left link mechanism 74L disposed on the left side of the shaft 46 and the right link mechanism 74R disposed on the right side of the shaft 46 each include a first driven gear 80, a second driven gear 82, a first tie rod 84, and a second tie rod 86.

The first driven gear 80 is a driven gear that can mesh with the first drive gear 70. The second driven gear 82 is a driven gear that can mesh with the second drive gear 72.

The teeth of the first driven gear 80 and the teeth of the second driven gear 82 extend in a direction intersecting the axis AX of the shaft 46. This direction is practically orthogonal to the axis AX of the shaft 46. The tooth trace of the first driven gear 80 and the tooth trace of the second driven gear 82 are practically parallel to the axis AX of the shaft 46. The first driven gear 80 and the second driven gear 82 may be spur gears.

A radius R3 (FIG. 3) of the addendum circle of the first driven gear 80 is smaller than a radius R4 (FIG. 3) of the addendum circle of the second driven gear 82. Although not shown, the radius of the root circle of the second driven gear 82 is larger than the radius of the root circle of the first driven gear 80. In the present embodiment, the second driven gear 82 is disposed below the first driven gear 80 (see FIG. 4).

The first driven gear 80 and the second driven gear 82 are each formed in a fan shape. A central angle θ1 (FIG. 3) of the first driven gear 80 is larger than a central angle θ2 (FIG. 3) of the second driven gear 82.

The first driven gear 80 and the second driven gear 82 are connected to each other. The relative position between the first driven gear 80 and the second driven gear 82 connected to each other is fixed.

A center C1 (FIG. 3) of the first driven gear 80 and a center C2 (FIG. 3) of the second driven gear 82 are located at a gear connection portion GC where the first driven gear 80 and the second driven gear 82 are connected. The center C1 (FIG. 3) of the first driven gear 80 and the center C2 (FIG. 3) of the second driven gear 82 coincide with each other. Note that the gear connection portion GC may be fixed to the vehicle body frame 12 via, for example, a rod-shaped member or the like.

When the connected body of the first driven gear 80 and the second driven gear 82 is viewed from the front (see FIG. 3), the connected body is formed in a semicircular shape having two addendum arcs (tooth tip arcs). In the left link mechanism 74L, the first driven gear 80 and the second driven gear 82 are arranged in this order in a first rotation direction D1 about the gear connection portion GC. On the other hand, in the right link mechanism 74R, the first driven gear 80 and the second driven gear 82 are arranged in this order in a second rotation direction D2 about the gear connection portion GC.

The first tie rod 84 serves as a link that connects the first driven gear 80 and the pedestal portion 64 of one of the pair of support members. One end portion of the first tie rod 84 is rotatably fixed to the first driven gear 80. The one end portion of the first tie rod 84 is fixed to, for example, a lower surface of a gear body of the first driven gear 80. The other end portion of the first tie rod 84 is rotatably fixed to the pedestal portion 64. The other end portion of the first tie rod 84 is fixed to, for example, a rear end portion of the pedestal portion 64.

The second tie rod 86 serves as a link that connects the second driven gear 82 and the pedestal portion 64 of one of the pair of support members. The second tie rod 86 extends along the first tie rod 84. The second tie rod 86 is located forward of the first tie rod 84. In the present embodiment, the second tie rod 86 is disposed below the first tie rod 84.

One end portion of the second tie rod 86 is rotatably fixed to the second driven gear 82. The one end portion of the second tie rod 86 is fixed to, for example, a lower surface of a gear body of the second driven gear 82. The other end portion of the second tie rod 86 is rotatably fixed to the pedestal portion 64. The other end portion of the second tie rod 86 is fixed to, for example, a protrusion of the pedestal portion 64 that protrudes toward the shaft 46. The pedestal portion 64 to which the other end portion of the second tie rod 86 is fixed is the same as the pedestal portion 64 to which the other end portion of the first tie rod 84 is fixed.

Figure 5:
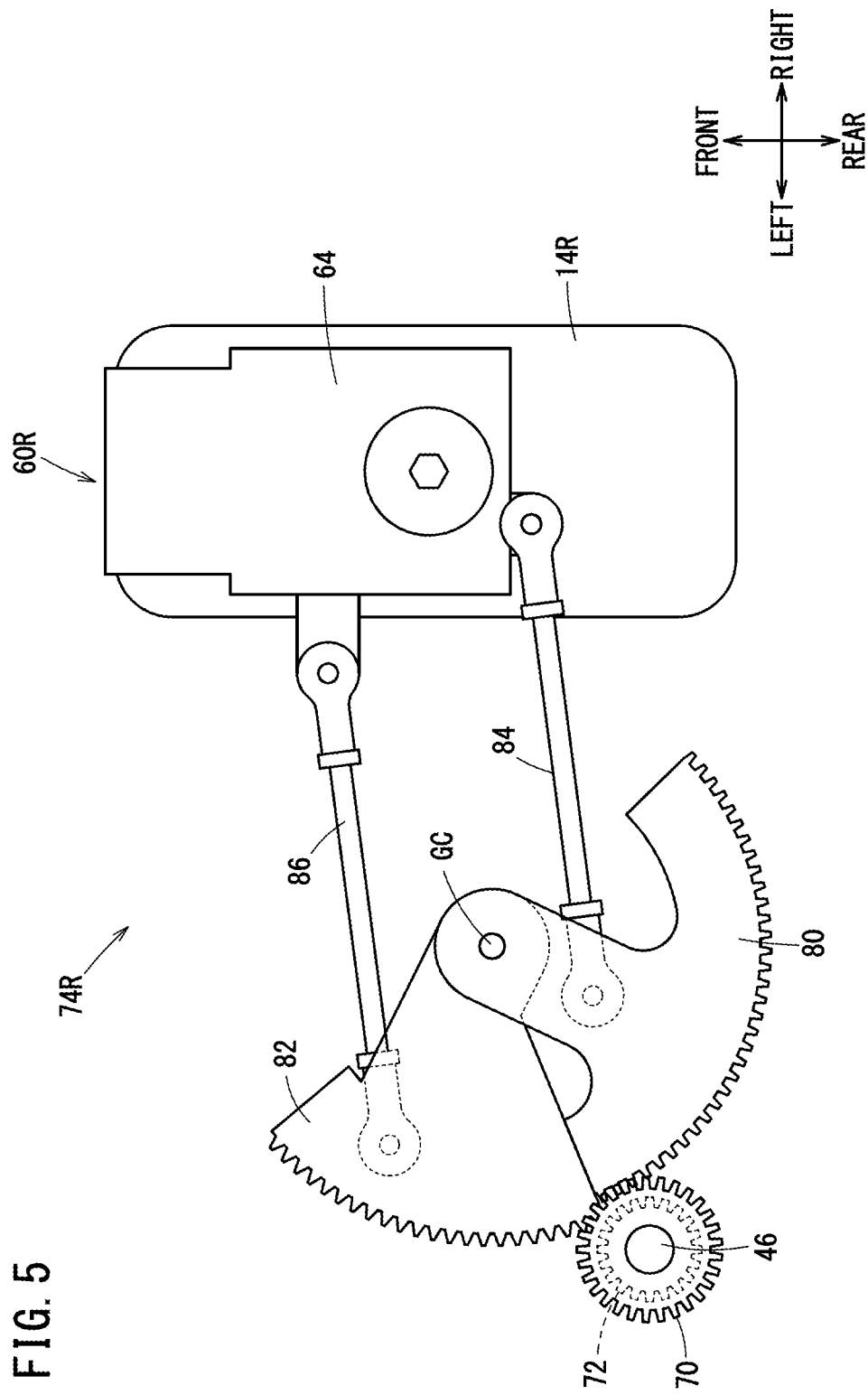
FIG. 5 is a diagram showing a right link mechanism during straight traveling.
Figure 6:
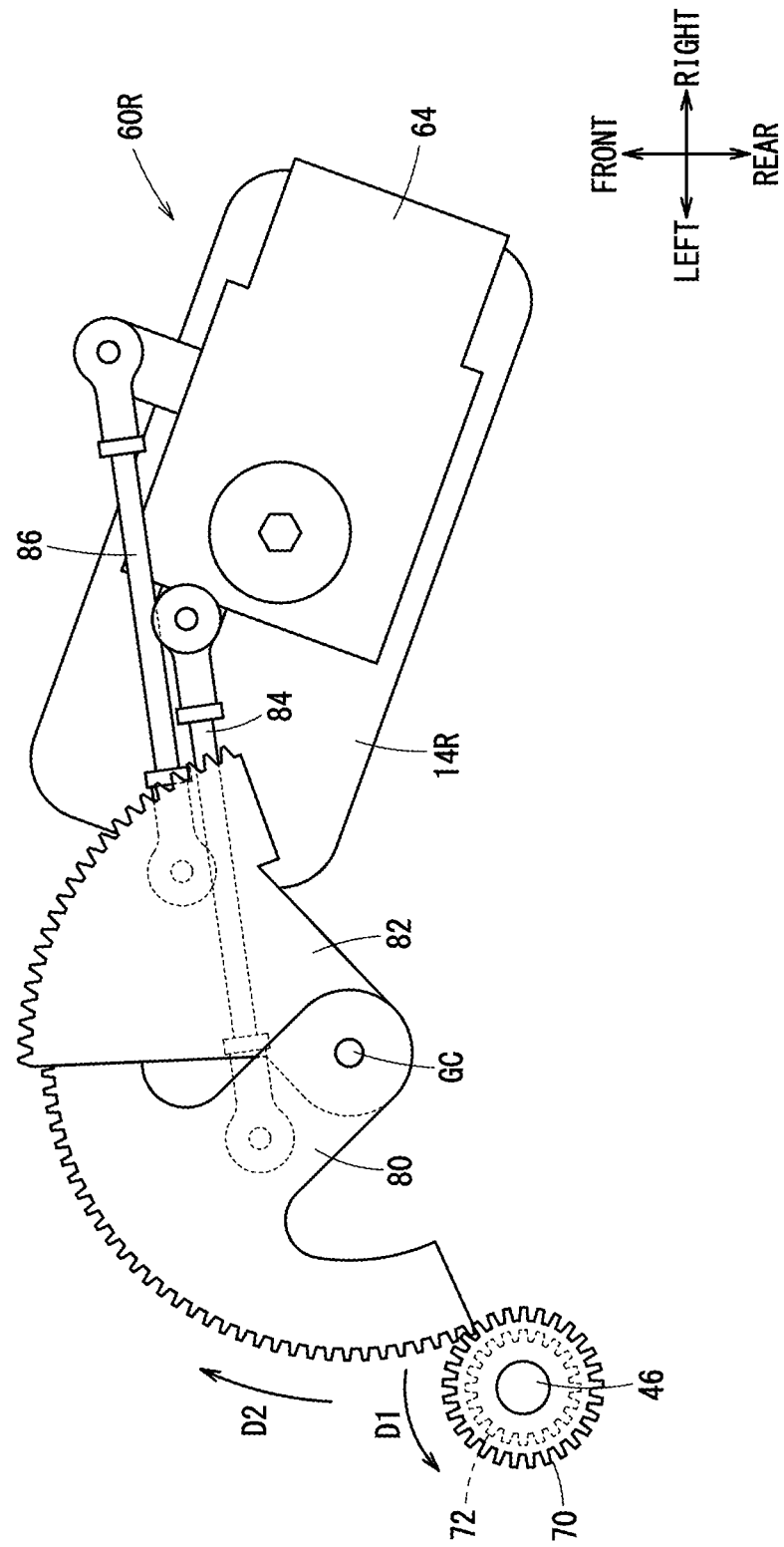
FIG. 6 is a diagram showing the right link mechanism during a right turn.
Figure 7:
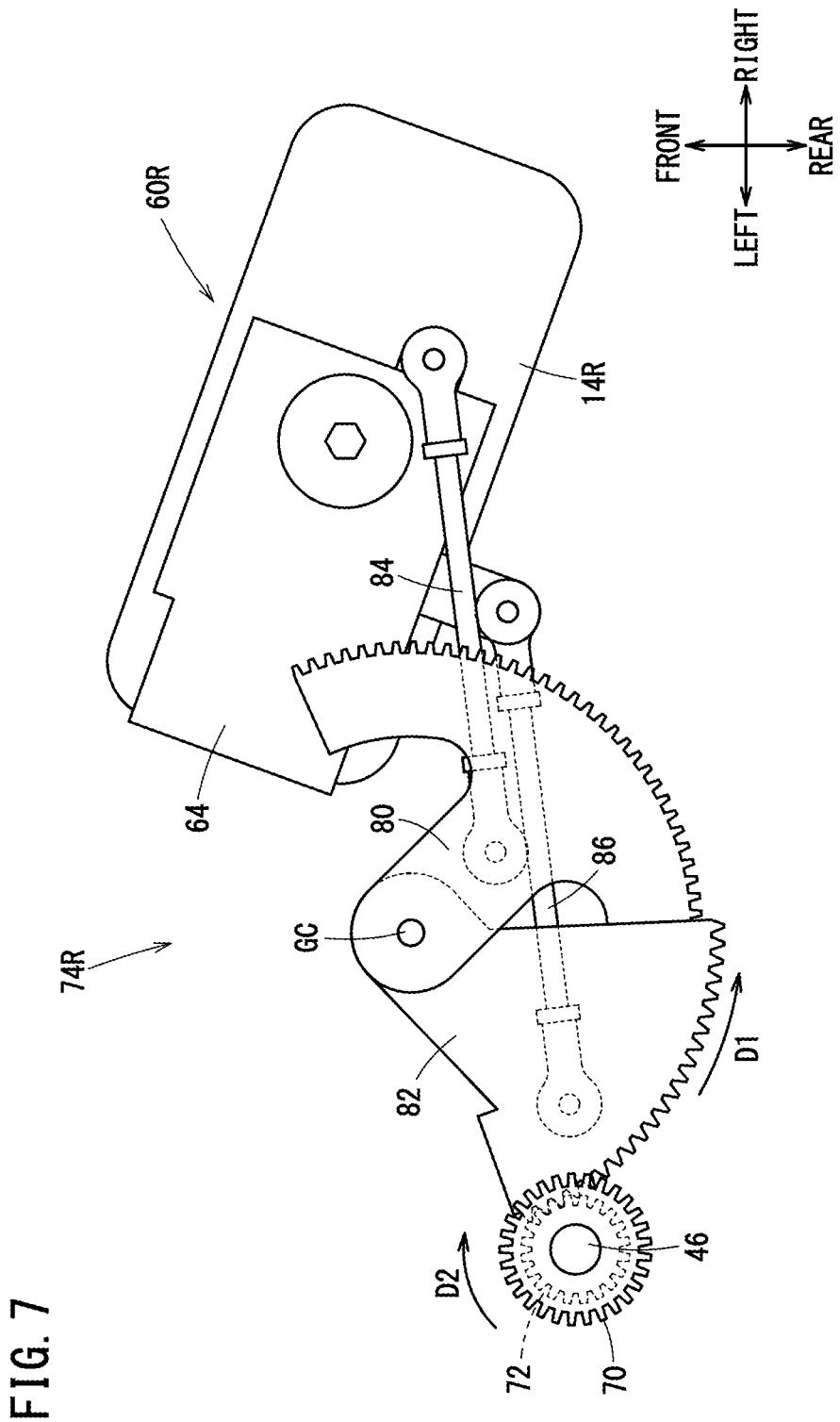
FIG. 7 is a diagram showing the right link mechanism during a left turn.

Next, the operation of the steering system 48 will be described with reference to FIGS. 5 to 7. FIG. 5 is a diagram showing the right link mechanism 74R during straight traveling. FIG. 6 is a diagram showing the right link mechanism 74R during a right turn. FIG. 7 is a diagram showing the right link mechanism 74R during a left turn.

As shown in FIG. 5, when the rotational position of the shaft 46 is at the initial position, the first drive gear 70 and the first driven gear 80 mesh with each other in the right link mechanism 74R. Similarly, also in the left link mechanism 74L, the first drive gear 70 and the first driven gear 80 mesh with each other (see FIG. 3). When the rotational position of the shaft 46 is at the initial position, the second drive gear 72 and the second driven gear 82 in each of the right link mechanism 74R and the left link mechanism 74L do not mesh with each other.

As shown in FIG. 6, when the shaft 46 rotates in the first rotation direction D1 from the initial position, the first drive gear 70 and the second drive gear 72 rotate about the shaft 46 in the first rotation direction D1 from the initial position. In response to this rotation, the left link mechanism 74L and the right link mechanism 74R operate in opposition to each other.

In the right link mechanism 74R, as shown in FIG. 6, the first driven gear 80 and the second driven gear 82 rotate in the second rotation direction D2 about the gear connection portion GC. As a result, the right front wheel 14R, which is the right steered wheel, turns to the right. The angle by which the right front wheel 14R makes a right turn from the straight traveling state when steered to the maximum extent is, for example, 110 degrees.

In the right link mechanism 74R, when the first driven gear 80 and the second driven gear 82 rotate in the second rotation direction D2 about the gear connection portion GC, the gear meshing state is maintained in a first state without transitioning from the first state to a second state. The first state is a state in which the first drive gear 70 and the first driven gear 80 mesh with each other. The second state is a state in which the second drive gear 72 and the second driven gear 82 mesh with each other.

In the left link mechanism 74L, although not shown, the first driven gear 80 and the second driven gear 82 rotate in the first rotation direction D1 about the gear connection portion GC. As a result, the left front wheel 14L, which is the left steered wheel, turns to the right. The angle by which the left front wheel 14L makes a right turn from the straight traveling state when steered to the maximum extent is, for example, 70 degrees.

In the left link mechanism 74L, when the first driven gear 80 and the second driven gear 82 rotate in the first rotation direction D1 about the gear connection portion GC, the gear meshing state transitions from the first state to the second state.

As shown in FIG. 7, when the shaft 46 rotates in the second rotation direction D2 from the initial position, the first drive gear 70 and the second drive gear 72 rotate about the shaft 46 in the second rotation direction D2 from the initial position. In response to this rotation, the left link mechanism 74L and the right link mechanism 74R operate in opposition to each other.

In the right link mechanism 74R, as shown in FIG. 7, the first driven gear 80 and the second driven gear 82 rotate in the first rotation direction D1 about the gear connection portion GC. As a result, the right front wheel 14R turns to the left. In this case, the gear meshing state transitions from the first state to the second state.

In the left link mechanism 74L, although not shown, the first driven gear 80 and the second driven gear 82 rotate in the second rotation direction D2 about the gear connection portion GC. As a result, the left front wheel 14L turns to the left. In this case, the gear meshing state is maintained in the first state without transitioning from the first state to the second state.

As described above, in the steering system 48 of the present embodiment, the second driven gear 82 meshes with the second drive gear 72 in one of the pair of link mechanisms in accordance with the rotation of the shaft 46 in the first rotation direction D1 from the initial position. In this case, the first driven gear 80 meshes with the first drive gear 70 in another of the pair of link mechanisms. On the other hand, in the steering system 48 of the present embodiment, the first driven gear 80 meshes with the first drive gear 70 in the one of the pair of link mechanisms in accordance with the rotation of the shaft 46 in the second rotation direction D2 from the initial position. In this case, the second driven gear 82 meshes with the second drive gear 72 in the other of the pair of link mechanisms.

Accordingly, in the steering system 48 of the present embodiment, it is possible to make the turning angle of the inner wheel larger than the turning angle of the outer wheel while reducing the minimum turning radius. As a result, it is possible to achieve both stability and the ability to make a sharp turn.

Further, in the steering system 48 of the present embodiment, the first driven gear 80 and the second driven gear 82 are each formed in a fan shape. As a result, the turning angle of the inner wheel can be made larger than the turning angle of the outer wheel while reducing the weight of the gears.

Furthermore, in the steering system 48 of the present embodiment, the central angle θ1 of the first driven gear 80 is larger than the central angle θ2 of the second driven gear 82. This makes it possible to increase the steering angle of the inner wheel.

In addition, in the steering system 48 of the present embodiment, when the shaft 46 is located at the initial position, the first driven gear 80 meshes with the first drive gear 70, and the second driven gear 82 does not mesh with the second drive gear 72. As a result, only one pair of gears mesh with each other at the time of straight traveling, and the load on the second driven gear 82 and the second drive gear 72 can be reduced.

In the steering system 48 of the present embodiment, the length of the first tie rod 84 is equal to the length of the second tie rod 86. This makes it possible to avoid dead points in the pair of link mechanisms.

The steering system 48 of the present embodiment is provided in the work machine 10. The turning angle of the inner wheel can be made larger than the turning angle of the outer wheel while reducing the minimum turning radius in the work machine 10. As a result, it is possible to achieve both stability and the ability to make a sharp turn. In a case where the work machine 10 is a grass mower, it is possible to reduce the amount of grass that is left uncut.

Further, in the steering system 48 of the present embodiment, the gear conditions of the first driven gear 80 and the second driven gear 82 can be determined such that the relationship between the inner and outer wheel steering angles of the Ackermann Jeantaud theory is realized. The gear conditions include an arc angle, a gear radius, the number of teeth, and a gear ratio.

Figure 8:
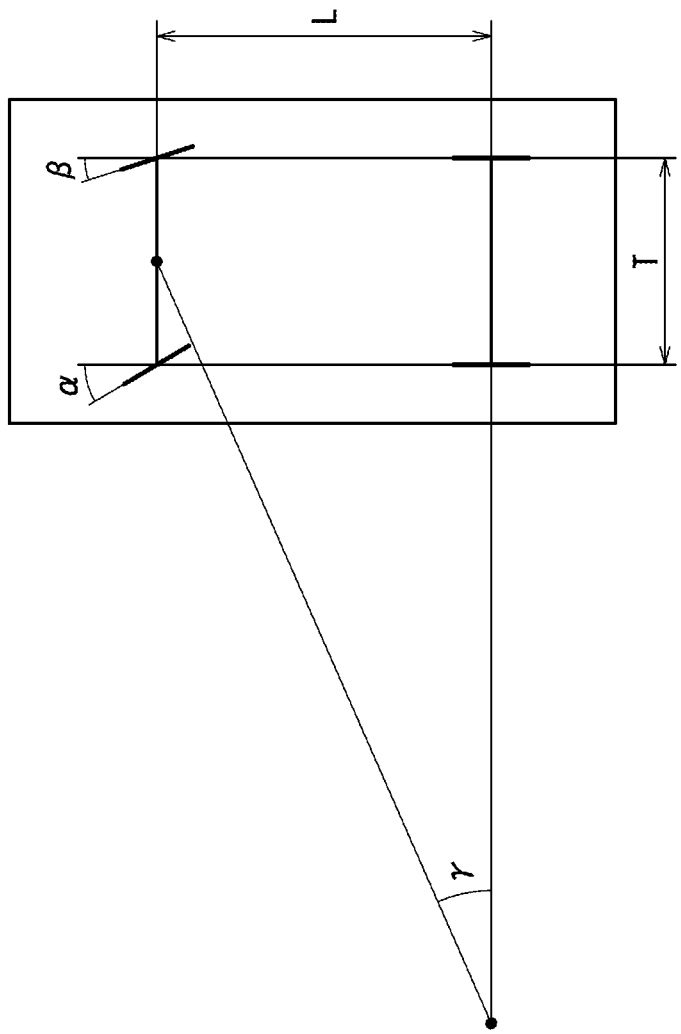
FIG. 8 is a diagram showing an inner wheel angle, an outer wheel angle, and a motor angle.

For example, the gear radius can be derived as follows. FIG. 8 is a diagram showing an inner wheel angle α, an outer wheel angle β, and a motor angle γ. The motor angle γ corresponds to a rotation angle input to the steering motor 44.

If a wheelbase L and a tread T of the vehicle are determined, the Ackermann Jeantaud theoretical curve is expressed by the following equation (1):

$$\frac{L}{T} = \frac{1}{\tan\alpha} - \frac{1}{\tan\beta} \qquad (1)$$

The ratio between the angle of an inner wheel "fast" with respect to the motor angle γ, and the angle of an outer wheel "slow" with respect to the motor angle γ, is expressed by the following equation (2):

$$\varepsilon_{fast} = \frac{\alpha}{\gamma} \quad \varepsilon_{slow} = \frac{\beta}{\gamma} \qquad (2)$$

The above ratio is reflected in the pitch circle of the drive gear and the pitch circle of the driven gear. The distance to the contact point of the drive gear with the driven gear is represented by "d". In this case, a pitch radius R of the drive gear is expressed by the following equation (3):

$$R_{fast} = d \times \varepsilon_{fast} \quad R_{slow} = d \times \varepsilon_{fast} \qquad (3)$$

Further, the center distance between the drive gear and the driven gear is represented by "D". In this case, a pitch radius r of the driven gear is expressed by the following equation (4):

$$r_{fast} = D - R_f \quad r_{slow} = D - R_s \qquad (4)$$

Further, the rotation angle of the drive gear is the motor angle γ. On the other hand, a rotation angle φ of the driven gear is expressed by the following equation (5):

$$\phi = \gamma \times \varepsilon_{fast} \quad \phi = \gamma \times \varepsilon_{slow} \tag{5}$$

Furthermore, the (X, Y) coordinates of the pitch circle of the drive gear are expressed by the following equation (6):

$$(X, Y)_{fast} = (R_{fast}\cos\theta, R_{fast}\sin\theta) \tag{6}$$
$$(X, Y)_{slow} = (R_{slow}\cos\theta, R_{slow}\sin\theta)$$

Similarly, the (x, y) coordinates of the pitch circle of the driven gear are expressed by the following equation (7):

$$(x, y)_{fast} = (r_{fast}\cos\phi, r_{fast}\sin\phi) \tag{7}$$
$$(x, y)_{slow} = (r_{slow}\cos\phi, r_{slow}\sin\phi)$$

Figure 9:
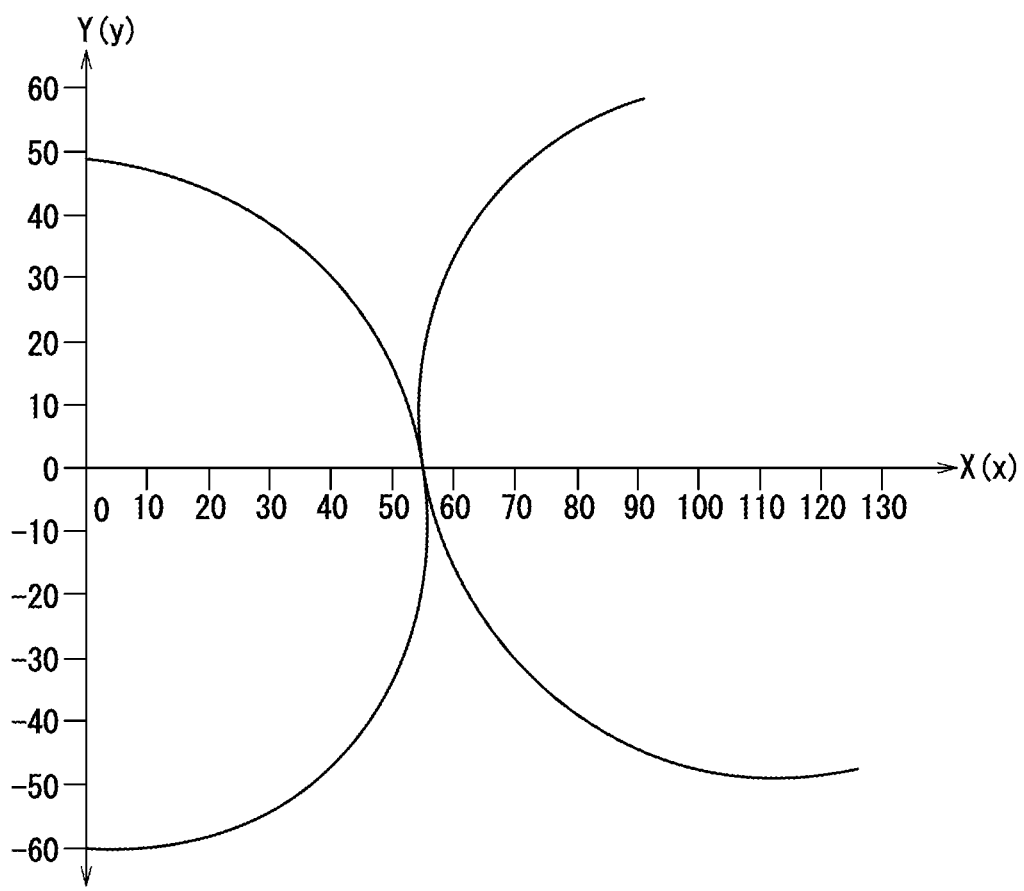
FIG. 9 is a diagram showing a drive gear and a driven gear that approximate a curve of the Ackermann Jeantaud theory.

FIG. 9 shows the pitch circle of the drive gear drawn based on the above (X, Y) coordinates, and the pitch circle of the driven gear drawn based on the above (x, y) coordinates.

The above-described embodiment may be modified as follows.

(Modification 1)

The second drive gear 72 may be disposed above the first drive gear 70. In this case, the second driven gear 82 is disposed above the first driven gear 80. Further, the second tie rod 86 is disposed below the first tie rod 84.

(Modification 2)

Figure 10:
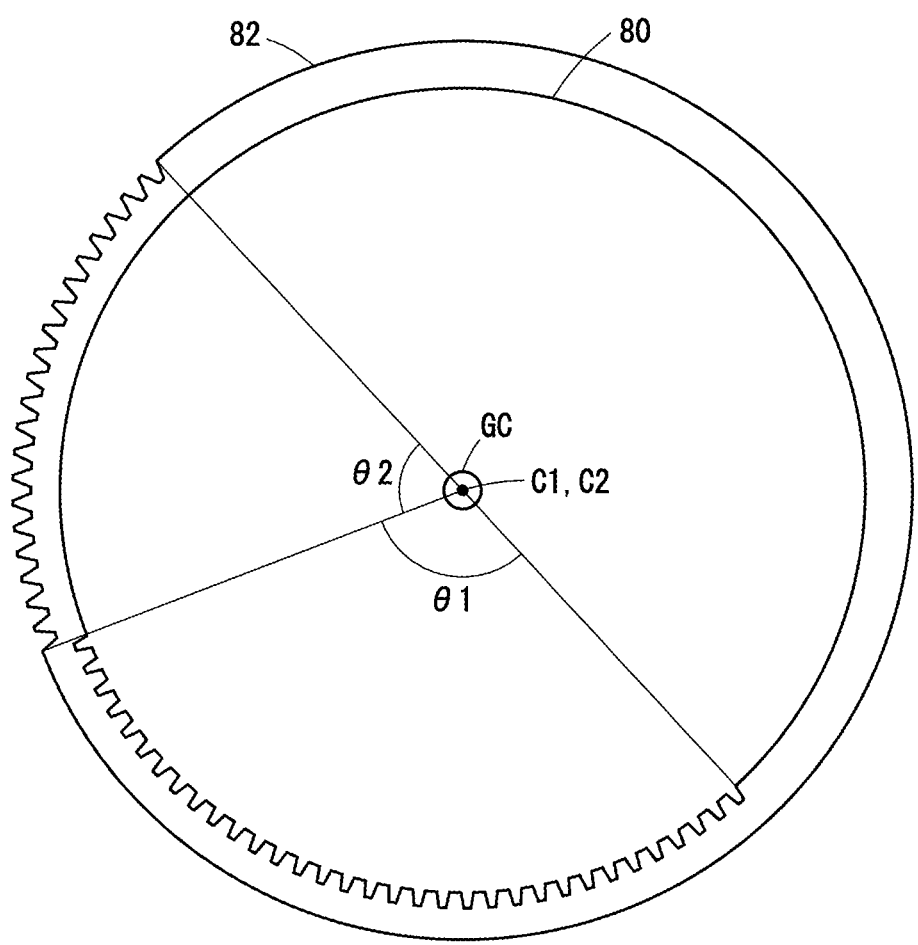
FIG. 10 is a diagram showing a modification of the shapes of a first driven gear and a second driven gear.

As shown in FIG. 10, the first driven gear 80 is not limited to a sector gear as long as a portion obtained by connecting the center C1 of the first driven gear 80 and the teeth at both ends among the teeth to be used is formed in a fan shape. The same applies to the second driven gear 82. Note that even a gear in which teeth are formed on the entire gear body in the circumferential direction thereof is applicable as the first driven gear 80 or the second driven gear 82 as long as the teeth to be used form an arc. Further, a stopper for restricting the teeth to be used may be formed on the gear body or the like.

(Modification 3)

When the shaft 46 is located at the initial position, the second driven gear 82 may mesh with the second drive gear 72, and the first driven gear 80 may not mesh with the first drive gear 70.

The following notes (appendices) are further disclosed in relation to the above-described embodiment and modifications.

(Appendix 1)

The present disclosure relates to the steering system (48) including: the shaft (46) rotatable in the first rotation direction (D1) or the second rotation direction (D2) opposite to the first rotation direction from the initial position that is the rotational position of the shaft during straight traveling; the steered wheels (14L, 14R) provided on the left and right sides and configured to be steered in accordance with rotation of the shaft; and the support members (60L, 60R) provided on the left and right sides and each configured to support corresponding one of the steered wheels. The steering system further includes the first drive gear (70) provided on the shaft; the second drive gear (72) provided on the shaft at a distance from the first drive gear in the direction of the axis (AX) of the shaft; and the pair of link mechanisms (74L, 74R) disposed on both sides of the shaft. Each of the pair of link mechanisms includes: the first driven gear (80) configured to mesh with the first drive gear; the second driven gear (82) whose relative position with respect to the first driven gear is fixed, the second driven gear being configured to mesh with the second drive gear; the first tie rod (84) configured to connect the first driven gear and corresponding one of the support members, and the second tie rod (86) extending along the first tie rod and configured to connect the second driven gear and corresponding one of the support members. The radius (R1) of the addendum circle of the first drive gear is larger than the radius (R2) of the addendum circle of the second drive gear, and the radius (R3) of the addendum circle of the first driven gear is smaller than the radius (R4) of the addendum circle of the second driven gear. In accordance with the rotation of the shaft in the first rotation direction from the initial position, the second driven gear meshes with the second drive gear in one of the pair of link mechanisms and the first driven gear meshes with the first drive gear in another of the pair of link mechanisms, and in accordance with the rotation of the shaft in the second rotation direction from the initial position, the first driven gear meshes with the first drive gear in the one of the pair of link mechanisms and the second driven gear meshes with the second drive gear in the other of the pair of link mechanisms.

(Appendix 2)

In the steering system according to Appendix 1, the first driven gear and the second driven gear are each formed in a fan shape.

(Appendix 3)

In the steering system according to Appendix 2, when the shaft is located at the initial position, the first driven gear meshes with the first drive gear, or the second driven gear meshes with the second drive gear.

(Appendix 4)

In the steering system according to Appendix 1, when the shaft is located at the initial position, the first driven gear meshes with the first drive gear, or the second driven gear meshes with the second drive gear.

(Appendix 5)

In the steering system according to Appendix 1, the length of the first tie rod is equal to the length of the second tie rod.

(Appendix 6)

The present disclosure relates to the work machine (10) including the steering system according to Appendix 1.

It should be noted that the present invention is not limited to the disclosure described above, and various configurations can be adopted therein without departing from the essence and gist of the present invention.

The invention claimed is:

1. A steering system comprising:
 a shaft rotatable in a first rotation direction or a second rotation direction opposite to the first rotation direction from an initial position that is a rotational position of the shaft during straight traveling;
 steered wheels provided on left and right sides and configured to be steered in accordance with rotation of the shaft;
 support members provided on the left and right sides and each configured to support corresponding one of the steered wheels;
 a first drive gear provided on the shaft;
 a second drive gear provided on the shaft at a distance from the first drive gear in an axial direction of the shaft; and a pair of link mechanisms disposed on both sides of the shaft, wherein each of the pair of link mechanisms includes:

a first driven gear configured to mesh with the first drive gear;

a second driven gear whose relative position with respect to the first driven gear is fixed, the second driven gear being configured to mesh with the second drive gear;

a first tie rod configured to connect the first driven gear and corresponding one of the support members; and a second tie rod extending along the first tie rod and configured to connect the second driven gear and corresponding one of the support members, and wherein a radius of an addendum circle of the first drive gear is larger than a radius of an addendum circle of the second drive gear, a radius of an addendum circle of the first driven gear is smaller than a radius of an addendum circle of the second driven gear, in accordance with the rotation of the shaft in the first rotation direction from the initial position, the second driven gear meshes with the second drive gear in one of the pair of link mechanisms and the first driven gear meshes with the first drive gear in another of the pair of link mechanisms, and in accordance with the rotation of the shaft in the second rotation direction from the initial position, the first driven gear meshes with the first drive gear in the one of the pair of link mechanisms and the second driven gear meshes with the second drive gear in the other of the pair of link mechanisms.

2. The steering system according to claim 1, wherein the first driven gear and the second driven gear are each formed in a fan shape.

3. The steering system according to claim 2, wherein a central angle of the first driven gear is larger than a central angle of the second driven gear.

4. The steering system according to claim 3, wherein when the shaft is located at the initial position, the first driven gear meshes with the first drive gear, or the second driven gear meshes with the second drive gear.

5. The steering system according to claim 1, wherein a length of the first tie rod is equal to a length of the second tie rod.

6. A work machine comprising the steering system according to claim 1.

* * * * *